April 7, 1959 F. A. MORRIS 2,881,313
DEMODULATOR CIRCUIT
Filed Sept. 26, 1955
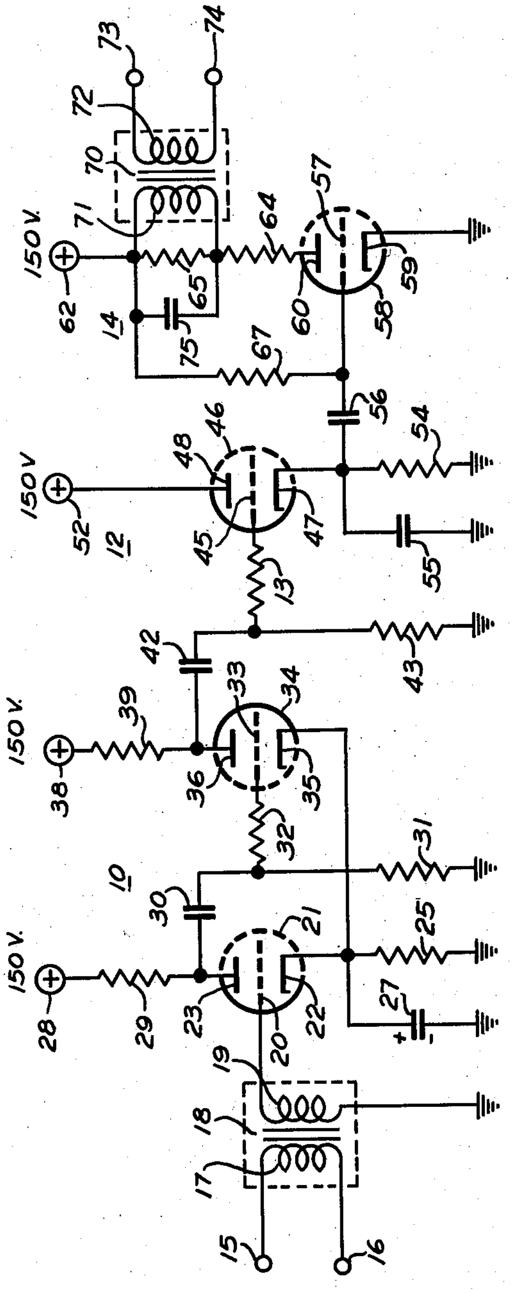
INVENTOR.
FRANK A. MORRIS
BY
Francis E Blake
ATTORNEY 2,881,313

DEMODULATOR CIRCUIT

Frank A. Morris, Fishers, N.Y., assignor to General Dynamics Corporation, a corporation of Delaware Application September 26, 1955, Serial No. 536,575
1 Claim. (Cl. 250—27)

The present invention relates to a demodulator and more particularly to a method of and a demodulator for deriving a train of polarized pulses from a pulse modulated wave.

The usual pulse modulated wave comprises a train of spaced pulses of energy, at the carrier frequency, which pulses are representative of the intelligence being transmitted, and circuit arrangements for demodulating pulse modulated waves of this type are relatively common and operate satisfactorily. However, in detecting pulse modulated waves of the type wherein the intelligence in the wave is in the form of spaces of no energy or zero voltage level in the carrier wave, the prior art type demodulators do not satisfactorily detect the tips of sharp pulses because of their inherently poor operation at low signal levels. Although the prior art type demodulators can be used to derive a satisfactory train of pulses from the modulated wave by amplifying the modulated wave, thereby to detect it at a high level, the matter of tube economy and wide operating range makes such an arrangement undesirable.

Therefore, an important object of the present invention is to provide a new and improved circuit for detecting a pulse modulated wave.

Another object of the present invention is to provide a new and improved amplitude detector for a modulated wave in which pulses of zero signal level are provided.

A further object of the invention is to provide a new and improved method of demodulating a pulse modulated wave of the type in which the pulses therein have a zero voltage level.

Briefly, the above objects are realized in accordance with the present invention by providing a method of and apparatus for demodulating a pulse modulated wave of the above-described type in which the pulses are in the form of spaces of zero energy level in the carrier wave, which method comprises the steps of providing a cathode follower circuit, amplifying the modulated wave, and supplying it through a D.C. impedance to the input of the cathode follower so as to over-drive the cathode follower circuit and thereby produce the modulation wave in the output circuit thereof.

Further objects and advantages and a better understanding of the invention may be had from the following detailed description and the single figure of the drawing which is a schematic diagram of a demodulator embodying the present invention.

Referring now to the drawing, the demodulator of the present invention comprises a two-stage cascade coupled amplifier 10 for amplifying the modulated signal prior to its application through a D.C. impedance 13 to a cathode follower 12, whereby the cathode follower 12 is over-driven so as to provide, at the output terminals thereof, a polarized signal wave having pulses of energy therein corresponding in time and shape to the pulses modulated on the input wave to the demodulator. The D.C. pulses which are thus derived from the modulated carrier wave by the cathode follower 12 are coupled to a zero bias amplifier 14 which serves to complete the detection of the modulating pulses by performing additional clipping and limiting of the detected wave thereby to deliver a signal voltage of pulse waveform at the proper level and impedance for coupling to a utilization circuit such as, for example, a counting network (not shown).

Considering the demodulator of the present invention more in detail, a modulated carrier wave is supplied by suitable means, such as a telephone line, to a pair of input terminals 15 and 16 which are connected to opposite ends of the primary winding 17 of an input transformer 18, the secondary winding 19 of which is connected between ground and a control electrode 20 of a triode amplifier tube 21 also having a cathode 22 and an anode 23. The cathode 22 is connected to ground through a cathode resistor 25 which is bypassed to ground for high frequencies by means of a capacitor 27. The anode-to-cathode circuit of the triode 21 is energized from a suitable source of polarized energization voltage (not shown) connected to a terminal 28 through a suitable anode resistor 29.

The amplified and inverted signal appearing between the anode 23 and ground is coupled through a capacitor 30 across a resistor 31, the voltage signal thus developed across the resistor 31 being coupled through an isolating resistor 32 to a control grid 33 of a triode amplifier tube 34 also having a cathode 35 and an anode 36. The anode-to-cathode circuit of the triode 34 is energized from a suitable source of polarized energization voltage connected to a terminal 38 through a suitable anode resistor 39. The self-biasing network consisting of the resistor 25 and the capacitor 27, which is provided in the cathode circuit of the triode 21, is also utilized for biasing the input circuit of the triode 34, and consequently, the cathode 35 thereof is directly connected to the cathode 22. It will thus be seen that the amplifiers comprising the triodes 21 and 34 are connected in a cascade relationship so that the input signal which is applied between the control electrode 20 and the cathode 22 of the triode 21 is amplified and appears between the anode 36 and ground in-phase with the input signal. This highly amplified in-phase signal is coupled through a capacitor 42 across a resistor 43 and thence through the resistor 13 for detection in the cathode follower 12.

The cathode follower 12 suitably consists of a triode 46 having a control electrode 45, a cathode 47 and an anode 48, which anode is directly connected to a terminal 52 to which is supplied a suitable polarized energizing voltage. The cathode 47 is connected to ground through a low resistance cathode resistor 54 which is by-passed to ground for high frequencies by a capacitor 55. As previously indicated, the pulse modulated input signal which is provided between the terminals 15 and 16 has a zero voltage level at the peaks of the pulses and that portion of the wave adjacent to the base of the intelligence carrying pulses has a positive voltage level. It will be understood, of course, that the signal supplied across the terminals 15 and 16 may have a negative value intermediate the pulses, in which case an additional stage of amplification would be needed for providing an input pulse modulated wave to the control electrode 45 of the discharge device 46 which has a positive level intermediate the pulses.

Since the attenuation of the telephone line over which the modulated wave is supplied may vary and since the characteristics of the amplifiers as well as the value of the energization voltage for these amplifiers may also vary, the magnitude of the pulse modulated signal which is supplied to the cathode follower 12 may vary between relatively wide limits, and because it is desirable that the train of pulses derived from this wave have a relatively constant amplitude, the dropping resistor 13 is serially connected in the input circuit of the cathode follower 12. As a result, when the amplitude of the modulated carrier wave is sufficiently high to effect space current conduction between the control electrode 45 and the cathode 47, a polarized voltage is developed across the resistor 13 which is in opposition to the input signal, thereby to reduce the magnitude of the space current and, consequently, the magnitude of the signal developed across the cathode resistor 54.

As previously indicated, the intelligence in the signal wave is in the zero energy level portion thereof, which, of course, in the absence of one-hundred percent modulation is somewhat above zero. Therefore, since the carrier wave is not one hundred percent modulated, as the attenuation on the line decreases the level of the intelligence portion of the signal wave increases in proportion to the increase in the level of the intermediate portions of the wave. Consequently, the conventional type demodulator circuits being relatively non-linear in the no signal region do not accurately detect the signal wave, but the demodulator of the present invention does accurately detect this signal because the device 46 is always operated for the intelligence portion of the signal wave at the same point on its characteristic curve, irrespective of the amplitude of the signal supplied thereto. This fixedly positioning of the operating point of the device 46 is achieved by means of the dropping resistor 13 which during grid conduction, prevents build-up of a higher than normal voltage across the capacitor 55 thereby to maintain the bias voltage developed in the cathode circuit of the device 46 at a relatively fixed value. As thus far described, it will be seen that the circuit of the present invention provides across the cathode resistor 54 and thus across the capacitor 55 a voltage wave comprising a train of polarized pulses having a relatively constant amplitude irrespective of variations in the level of the input signal supplied across the terminals 15 and 16.

The output of the cathode follower 12 is coupled through a capacitor 56 to a control electrode 57 of a triode 58 also having a cathode 59 and an anode 60. The cathode 59 is directly connected to ground so as to provide a zero bias on the triode 58 whereby limiting of the pulses in the train of pulses provided across the cathode resistor 54, and the clipping of the positive portion of the wave which may consist of those components of the carrier wave which are not filtered out by the capacitor 55 in the cathode follower circuit are provided.

The anode-to-cathode circuit of the triode 58 is energized from a suitable source of polarized energization voltage which is connected to a terminal 62, and in order to reduce the voltage developed across the primary winding 71 of an output transformer 70 a pair of anode resistors 64 and 65 are serially connected as a voltage divider between the anode 60 and the terminal 62. A resistor 67 is connected between the terminal 62 and the control electrode 57 to provide a positive voltage between the control electrode 57 and the cathode 59 to limit the transmission of signals below a predetermined level since signals below that level contain a considerable percentage of undesirable distortion components. In order to couple the output signal from the triode 58 to a work circuit such as a counting network, the coupling transformer 70 is provided having the primary winding 71 thereof connected across the anode resistor 65 and the secondary winding 72 adapted to be connected through the respective terminals 73 and 74 across a work circuit. In order further to remove any high frequency components which may be provided in the output wave from the triode 58, a by-pass capacitor 75 is connected across the resistor 65.

While it is understood that the circuit specifications of the demodulator of the present invention may vary according to the design for any particular application, the following values are included not by way of limitation but because they have been found to effect efficient operation of the particular embodiment of the invention described herein.

| | |
|---|---|
| Device **21** | ½ 12AU7. |
| Device **34** | ½ 12AU7. |
| Device **46** | ½ 12AX7. |
| Device **58** | ½ 5965. |
| Resistor **13** | 1 megohm. |
| Resistor **25** | 220 ohms. |
| Resistor **29** | 47,000 ohms. |
| Resistor **31** | 100,000 ohms. |
| Resistor **32** | 1 megohm. |
| Resistor **39** | 47,000 ohms. |
| Resistor **43** | 100,000 ohms. |
| Resistor **54** | 22,000 ohms. |
| Resistor **64** | 33,000 ohms. |
| Resistor **65** | 22,000 ohms. |
| Resistor **67** | 10 ohms. |
| Capacitor **27** | 5 microfarads. |
| Capacitor **30** | 560 micromicrofarads. |
| Capacitor **42** | 0.001 microfarad. |
| Capacitor **55** | 0.047 microfarad. |
| Capacitor **56** | 0.022 microfarad. |
| Capacitor **75** | 0.1 microfarad. |

While there has been described what is at present considered to be the preferred embodiment of the invention, it will be understood that various modifications may be made therein which are within the true spirit and scope of the invention as defined in the appended claim.

What is claimed as new and desired to be secured by Letters Patent of the United States is:

An apparatus for deriving a wave of pulses from a pulse modulated carrier wave of varying amplitude having the pulses in the form of spaces of zero energy level in the wave; comprising a cathode follower circuit including an electronic device having a control electrode and a cathode; a first resistance element connected between said cathode and a point of reference potential; a capacitive element shunting said first resistance element to provide a by-pass for high frequencies; an amplifier supplied with said modulated carrier wave and operable to supply said carrier wave to said cathode follower circuit for detection; a second resistance element connected to said control electrode, said second resistance element having a value substantially fifty times greater than the value of said first resistance element; and a capacitive voltage coupling network between said amplifier and said second resistance element, said voltage coupling network supplying a voltage to said cathode follower circuit of a large enough amplitude to overdrive said cathode follower circuit so that current flows through said second resistance element, the varying voltage drops across said first and second resistance elements being such as to bias said electronic device for operation in a fixed range of its characteristic curve so that said electronic device responds to said spaces of zero energy level in said carrier modulated waves substantially independent of the varying amplitude of the modulated carrier wave applied to the said amplifier.

References Cited in the file of this patent

UNITED STATES PATENTS

| | | |
|---|---|---|
| 2,429,755 | Hallmark | Oct. 28, 1947 |
| 2,532,534 | Bell | Dec. 5, 1950 |
| 2,653,233 | Carter | Sept. 22, 1953 |
| 2,653,235 | Cook et al. | Sept. 22, 1953 |
| 2,783,316 | Clapper | Feb. 26, 1957 |